United States Patent [19]

Aoyama et al.

[11] Patent Number: 4,824,904

[45] Date of Patent: Apr. 25, 1989

[54] RESIN COMPOSITIONS, LAMINATES AND BLOCK COPOLYMERS

[75] Inventors: Akimasa Aoyama; Takeshi Moritani; Kiyoshi Yonezu, all of Kurashiki; Takuji Okaya, Nagaokakyo, all of Japan

[73] Assignee: Kuraray Co., Ltd., Kurashiki, Japan

[21] Appl. No.: 27,862

[22] Filed: Mar. 19, 1987

[30] Foreign Application Priority Data

| Mar. 31, 1986 [JP] | Japan | 61-74934 |
| Mar. 31, 1986 [JP] | Japan | 61-74935 |
| Mar. 31, 1986 [JP] | Japan | 61-74936 |
| Mar. 31, 1986 [JP] | Japan | 61-74937 |

[51] Int. Cl.$^4$ ............... C08F 16/06; C08F 16/12; C08F 29/04
[52] U.S. Cl. ............... 525/60; 428/520; 525/57; 525/58; 525/59
[58] Field of Search ............... 525/57, 59, 60, 58

[56] References Cited

U.S. PATENT DOCUMENTS

| 3,322,703 | 5/1967 | Lindermann | 525/57 |
| 4,576,988 | 3/1986 | Tanaka et al. | 524/503 |
| 4,608,286 | 8/1986 | Motoishi et al. | 428/35 |
| 4,613,644 | 9/1986 | Moritani et al. | 524/430 |
| 4,619,849 | 10/1986 | Anzawa et al. | 428/35 |
| 4,636,551 | 1/1987 | Okaya et al. | 525/60 |
| 4,640,870 | 2/1987 | Akazawa et al. | 428/483 |
| 4,645,695 | 2/1987 | Negi et al. | 428/35 |

*Primary Examiner*—Jacob Ziegler
*Attorney, Agent, or Firm*—Kramer, Brufsky & Cifelli

[57] ABSTRACT

The present invention relates to resin compositions and laminates using saponified ethylene-vinyl acetate copolymers containing a polyether component. Formed products and laminates obtained from the resin compositions are flexible, excellent in flexural fatigue resistance and gas barrier properties and extremely useful as flexible laminates.

5 Claims, No Drawings

RESIN COMPOSITIONS, LAMINATES AND BLOCK COPOLYMERS

FIELD OF THE INVENTION

The present invention relates to resin compositions, laminates and block copolymers which are flexible and excellent in flexural fatigue resistance and in gas barrier properties.

BACKGROUND OF THE INVENTION

Saponified products of ethylene-vinyl acetate copolymers (hereafter referred to as EVOH) are widely known as melt-formable thermoplastic resins that are excellent in gas barrier properties, oil resistance, solvent resistance, flavor retention properties, etc. and have been used for films, sheets, containers, etc. in various wrapping arts.

However, EVOH has some disadvantages, such as it is rigid and fragile and lacks flexibility so that EVOH is scarcely used alone but has mainly been used in laminates with other thermoplastic resins. But cracks and pinholes are still formed in the EVOH layer because of violent vibrations, for example, due to transportation, flexural fatigue, etc. and, therefore, the excellent gas barrier properties cannot be retained.

SUMMARY OF THE INVENTION

One of the main objects of the present invention is to provide a resin composition having excellent flexural fatigue resistance and excellent gas barrier properties.

As a result of extensive investigations, the present inventors have discovered that the object described above can be achieved by blending EVOH-type copolymer containing a polyether component with ordinary EVOH.

The present invention is directed to a resin composition comprising 95 to 50 parts by weight of EVOH and 5 to 50 parts by weight of EVOH containing the polyether component.

The packaging materials composed of the resin composition according to the present invention are excellent in gas barrier properties, oil resistance, solvent resistance and flavor retention properties and greatly improve flexibility and flexural fatigue resistance. The aforesaid resin composition is extremely useful in various packaging arts not only as flexible laminate packaging materials but also as flexible single-layer packaging materials.

BRIEF DESCRIPTION OF THE DRAWING

FIG. 1 is an NMR spectrum of a reacetylated block copolymer wherein ethylene-vinyl acetate copolymer is added to both ends of polyoxypropylene.

DETAILED DESCRIPTION OF THE INVENTION

EVOH used in the present invention is a saponified ethylene-vinyl acetate copolymer having an ethylene content of 20 to 60 mol%, preferably 25 to 55 mol%, in which the vinyl acetate component has a saponification degree of at least 95%, preferably 98% or more. When the ethylene content becomes less than 20 mol%, not only is the formability decreased, but the gas barrier properties are also reduced under high humidity conditions. When the ethylene content exceeds 60 mol%, the gas barrier properties are greatly reduced, which is not preferred. When the saponification degree of the vinyl acetate component becomes less than 95%, the gas barrier properties are reduced, which is not preferred. In addition, other copolymerizable unsaturated monomers may also be included in a range that does not damage the properties of EVOH.

The term "ethylene content of 20 to 60 mol%" in the EVOH containing the polyether component indicates the content of ethylene present in the EVOH from which the polyether component has been excluded. The ethylene content and the saponification degree of both the EVOH containing the polyether component and the EVOH blended therewith can be freely chosen in the ranges described above, but it is preferred that both the ethylene content and the saponification degree of each is equal or approximately equal, for example, a difference in the ethylene contents of 20 mol% or less, preferably 10 mol% or less and a difference in the saponification degree of 3% or less, preferably 2% or less.

The polyether component, includes a component mainly composed of an oxyalkylene unit such as an oxyethylene unit, an oxypropylene unit, an oxyethylene-oxypropylene unit, an oxytetramethylene unit, etc. Among them, particularly preferred are the oxypropylene unit and the oxyethylene-oxypropylene unit. The polyether component may further include a polymethylene unit, an amide group, a urethane group, an ester group, a phenyl group, etc. therein.

As to the weight ratio of the EVOH component to the polyether component of the polyether component-containing EVOH copolymer in the present invention, it is preferred that the polyether component be at least 2 wt% from the viewpoint of imparting flexibility thereto and in view of dispersibility upon blending with EVOH, interaction therebetween or gas barrier properties, the polyether component be 90 wt% or less. As described above, the polyether component is at least 10 wt%, preferably 20 wt% or more and preferably not greater than 80 wt%, when employing the polyether component-containing EVOH copolymer as a blend with EVOH.

Processes for preparing the polyether component-containing EVOH copolymer in the present invention will be described below in detail.

A first type is a block copolymer of polyether and EVOH; where polyether and EVOH are expressed by P and E, respectively, the block copolymer is represented by P-E or E-P-E. Such a block copolymer can be prepared, for example, by the following processes, including a process which comprises copolymerizing vinyl acetate and ethylene in the presence of polyether containing a mercapto group(s) at the end(s) thereof (one end or both ends) followed by saponification in a conventional manner, a process which comprises polymerizing polyether containing a polymerizable double bond(s) therein in the presence of ethylene-vinyl alcohol copolymer containing a mercapto group at one end thereof, etc.

The polyether containing a polymerizable double bond(s) therein as used herein includes:

a (meth)allyl ether type represented the general formula:

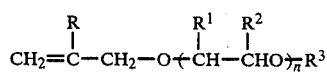

wherein R represents a hydrogen atom or a methyl group; $R^1$ and $R^2$ represents a hydrogen atom or an alkyl group having 1 to 10 carbon atoms; and $R^3$ represents a hydrogen atom or an alkyl group having 1 to 10 carbon atoms, an alkyl ester group (having 1 to 10 carbon atoms in the alkyl group) or an alkylamide group (having 1 to 10 carbon atoms in the alkyl group), for example polyoxyethylene (meth)allyl ether, polyoxypropylene (meth)allyl ether, etc.; n represents an integer of 1 to 100;

a (meth)allyl ether type represented by general formula:

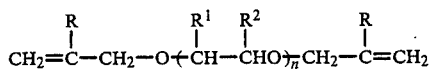

wherein R, $R^1$, $R^2$ and $R^3$ are the same as described above;

a (meth)acrylamide type having a double bond at one end thereof represented by general formula:

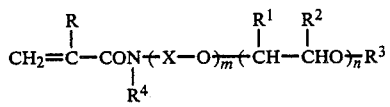

wherein R, $R^1$, $R^2$, $R^3$ are the same as described above, and $R^4$ represents a hydrogen atom or an alkyl group having 1 to 10 carbon atoms or

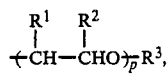

X represents an alkylene group, substituted alkylene group, phenylene group or substituted phenylene group having 1 to 10 carbon atoms; m represents 0 or an integer of 1 to 20; each of n and p represents an integer of 1 to 100 respectively; and $R^1$, $R^2$ and $R^3$ are the same as described above; for example, polyoxyethylene (meth)acrylamide, polyoxypropylene (meth)acrylamide, etc.;

a (meth)acrylic acid ester type represented by general formula:

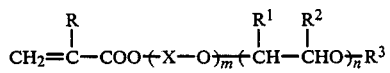

wherein R, $R^1$, $R^2$, $R^3$, X, m and n are the same as described above, for example, polyoxyethylene (meth)acrylate, polyoxypropylene (meth)acrylate, etc.; or, a vinyl ether type represented by general formula:

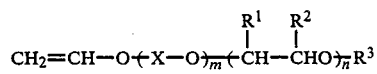

wherein $R^1$, $R^2$, $R^3$, X, m and n are the same as described above, for example, polyoxyethylene vinyl ether, polyoxypropylene vinyl ether, etc.

The next type is a graft copolymer in which polyether is added in a grafted form as a branch polymer of EVOH. Such a graft copolymer can be obtained, for example, by copolymerizing ethylene and vinyl acetate together with polyether containing a polymerizable double bond(s) at the end(s) thereof followed by saponification in a conventional manner.

A third type is a graft copolymer in which EVOH is added in a grafted form as a branch polymer of polyether. Such a graft copolymer can be obtained, for example, by copolymerizaing ethylene and vinyl acetate in the presence of polyether containing mercapto groups in the side chain thereof followed by saponification. The processes described above are representative examples, but the present invention is not deemed to be limited thereto.

The thus obtained polyether component-containing EVOH copolymer has a melt index (MI) of 0.1 to 250 g/10 mins. The MI as used herein is a value determined in accordance with ASTM D-1238-65T (2160 g, 190° C.). MI can be controlled by the degree of polymerization of the EVOH component, the degree of polymerization of the polyether component and weight ratio of the EVOH component to the polyether component. In the case of blending said polyether component-containing EVOH with ordinary EVOH, however, MI of said polyether component-containing EVOH can be chosen over a wide range.

The thus obtained polyether component-containing EVOH copolymer is blended with EVOH. The blending ratio varies depending upon the type, weight ratio and addition mode of polyether in the EVOH copolymer and further upon the desired efficiency, but it is generally preferred that the EVOH and the polyether component-containing EVOH copolymer be contained in 95 to 50 parts by weight and 5 to 50 parts by weight, respectively. It is preferred that MI or the EVOH used herein be 0.1 to 50 g/10 mins, more preferably 0.1 to 30 g/10 mins, and most preferably 0.1 to 20 g/10 mins. For blending, there can be adopted known methods such as a melt blending method using a Banbury mixer, a melt blending method using a single- or twin-screw extruder, etc.

Upon blending, other additives, for example, antioxidants, UV absorbants, lubricants, plasticizers, antistatic agents, coloring agents, etc. can be incorporated therein with a range that does not inhibit the effect and function of the present invention.

The thus obtained resin composition of the present invention is readily formable by known melt forming methods and can be formed into optional forming products such as films, sheets, cups, tubes, bottles, etc. Further in case that the resin composition is used as two, three or more layer laminates with the other thermoplastic resins, for example, polypropylene polyethylene, polyethylene terephthalate, polyamide, polystyrene, etc., forming is effected by known methods such as a multilayered co-extrusion method, a co-injection extrusion method, a coating method, etc. Further, where there are three or more layers, it is preferred that the composition of the present invention be used as an intermediate layer.

Further embodiments of the present invention will be described below.

As described hereinabove, for optimum gas barrier properties, the blend of EVOH and the polyether component-containing EVOH copolymer are preferably used, as will be noted from Examples 1-1 to 1-15. A laminate having excellent flexural fatigue resistance, excellent gas barrier properties and freedom form cracks or unevenness in drawing upon thermoforming (for example, upon deep drawing, drawing, blowing), can be obtained by providing an EVOH layer containing the polyether component. Laminates comprising a layer of a block copolymer which is the polyether component-containing EVOH copolymer, are shown in Examples 2-1 to 2-6. In this case, a weight ratio of the EVOH component to the polyether component in the block copolymer is 50 to 98 wt% of the EVOH component and 2 to 50 wt% of the polyether component. To impart flexibility thereto, the polyether component is at least 2 wt%, preferably 5 wt% or more. On the other hand, it is desirable that the polyether component is 50 wt% or less, preferably 30 wt% or less, to obtain excellent gas barrier properties. Further, MI of this block copolymer is 0.1 to 50 g/10 mins., preferably 0.3 to 25 g/10 mins.

In this block copolymer, Young's modulus is reduced to 2/3 to 1/10 that of ordinary EVOH, which is flexible and melt formable as in ordinary EVOH. The thermoplastic resins that can be used for laminating on this block copolymer, there are included polypropylene, polyethylene (branched or linear), ethylene-propylene copolymer, ethylene-vinyl acetate copolymer, thermoplastic polyester, polyamide, polystyrene, polycarbonate, polyvinyl chloride, etc. Among them, particularly preferred are linear polyethylene, polypropylene, ethylene-propylene copolymer, thermoplastic polyester and polystyrene.

To make laminates, the foregoing resins can be formed into a multilayered structure of two layers, three layers or more layers. In the case of three or more layers, the block copolymer layer is often used as an intermediate layer.

Methods for molding or forming to obtain such laminates, known methods can be used such as a co-extrusion method, a co-injection method, an extrusion lamination method, a coating method, etc. Particularly preferred is the co-extrusion method.

When preparing laminates, it is advantageous to insert an adhesive resin between respective layers. There is no particular limitation to the adhesive resin, but preferred examples include carboxyl-modified products of polyethylene, ethylene-vinyl acetate copolymer, polypropylene and ethylene-acrylic acid ester (methyl ester or ethyl ester, etc,) copolymer, etc. A product modified with maleic anhydride may be suitably used as such or in the form of blend with an unmodified polymer.

The thus formed laminates using the block copolymer are extremely useful as flexible laminate packaging materials because they exhibit extremely excellent properties in violent vibrations occurring during transportation, flexural fatigue, impact when dropped, fatigue caused by friction, etc. because of improved flexibility in the block copolymer layer, as compared to laminates obtained using conventional EVOH. These properties are more readily observed at low temperature.

Next, laminates bearing a layer of EVOH-type copolymer in which polyether is added in a grafted form as a branch polymer of EVOH or EVOH-type copolymer in which EVOH is added in a grafted form as a branch polymer of polyether (hereafter they are referred to as graft copolymers) are described in Examples 3-1 to 3-6. With respect to a weight ratio of the EVOH component to the polyether component in the graft copolymer, the polyether component is 2 to 60 wt%; the polyether component is at least 2 wt%, preferably 5 wt% or more from a viewpoint of imparting flexibility thereto and on the other hand, in view of gas barrier properties, the polyether component is at most 60 wt%, preferably 50 wt% or less. In this case the ethylene content is preferably 31 to 60 mol%.

In the graft copolymer, Young's modulus is reduced to 2/3 to 1/10 and impact strength becomes 2 to 50 times that of ordinary EVOH. The graft copolymer is flexible and excellent in impact resistance and is melt formable as in ordinary EVOH. As thermoplastic resins used for laminating with the graft copolymer, there can be used those as described above.

The thus formed laminates using the graft copolymer are extremely useful as flexible laminate packaging materials because they exhibit extremely excellent properties in violent vibrations occurring during transportation, flexural fatigue, impact when dropped, fatigue caused by friction, etc. because of improved flexibility in the EVOH layer, as compared to laminates obtained using conventional EVOH. These properties can be better observed at low temperatures.

Next, still another embodiment of the present invention will be described below.

The block copolymer used in the present invention in which the polyether component is added at the end of EVOH is novel.

As is also evident from the foregoing description, the block copolymer is melt formable, has good laminate formability with other thermoplastic resins and is excellent in flexibility, flexural fatigue resistance and gas barrier properties and therefore, is extremely useful as various packaging materials, especially as packaging materials for foodstuffs. Properties of the block copolymer are fully described in Examples 1-1 to 1-6 and 2-1 to 2-6 and clear from the description. Examples 1-1 to 1-3

In a reactor of a 1 liter volume equipped with a stirrer were charged 500 g of polyoxypropylene allyl ether (manufactured by Nippon Oils and Fats Co., Ltd., Unisafe PKA-5018) having a molecular weight of 3000 and containing polymerizable double bonds at both ends thereof and 4 mg of benzoyl peroxide. While stirring at room temperature, thioacetic acid was continuously added to the mixture at a rate of 13 g/hour for 3 hours. Then the unreacted thioacetic acid was removed out of the reaction system at 30° to 45° C. under reduced pressure. Next, 100 g of methanol and 1.1 g of sodium hydroxide were added to the system. After stirring at 60° C. for 2 hours in a nitrogen flow, acetic acid was added to the system to neutralize an excess of sodium hydroxide. Titration of mercapto groups of the thus obtained mercapto-polyoxypropylene with $I_2$ showed $6.56 \times 10^{-4}$ eq/g, wherein the both ends containing double bonds were almost quantitatively changed to mercapto groups.

Next, 14.5 kg of vinyl acetate and 31 g of mercapto-polyoxypropylene were charged in a polymerization tank of a 50 liter volume having a cooling coil inside, equipped with a stirred. After the air in the polymerization tank was replaced with nitrogen, the temperature was raised to 60° C. and ethylene was charged to render the pressure 43 kg/cm². Then, 14 g of polymerization initiator 2,2'-azobis-(2,4-dimethylvaleronitrile) was dissolved in 300 ml of methanol and the solution was added to the reaction system. Subsequently, mercapto-polyoxypropylene was added to the system at a rate of 440 g/hour for 4 hours to perform polymerization. A conversion of the vinyl acetate was 42%. Then, the copolymerization reaction solution was supplied to a stripping tower. After the unreacted vinyl acetate was removed from the top by feeding methanol from the bottom of the tower, saponification was performed using sodium hydroxide as a catalyst in a conventional manner. Then after thoroughly washing with acetone and then with water, the product was immersed in a diluted aqueous acetic acid solution and the system was dried at 60° to 105° C. in a nitrogen flow. The thus obtained EVOH copolymer was a block copolymer wherein EVOH was added to the both ends of polyoxypropylene. As a result of 500 MHZ$^1$N-NMR analysis, the composition had an ethylene content of 30.8% and a polyoxypropylene content of 31 wt%, and a sponification degree of the vinyl acetate component showed 99.1%. Further melt index (hereafter referred to as MI) measured at 190 g under a load of 2160 g according to ASTM D-1238-65T was 120 g/10 mins.

To confirm that thus obtained EVOH copolymer is a block copolymer wherein EVOH is added to the both ends of polyoxypropylene, that is, EVOH-S-polyoxypropylene-S-EVOH, the EVOH block copolymer was reacetylated, and then observed with 500 MHZ $^1$H-NMR. The NMR spectrum of thus obtained reacetylated product is shown in FIG. 1.

As the peak centered at 2.6 ppm is assigned to the methylene protons adjacement to sulfur, it is clear that this reacetylated product is a block copolymer wherein ethylene-vinyl acetate copolymer is added to the both ends of polyoxypropylene. Therefore, it is also clear that the aforesaid EVOH copolymer is a block copolymer wherein EVOH is added to the both ends of polyoxypropylene.

Next, the block copolymer (copolymer A) and EVOH having the ethylene content of 32.1 mol%, the saponification degree in the vinyl acetate component of 99.5% and MI of 0.61 g/10 mins. (EVOH No. 1) were blended in various proportions. The blends were extrusion molded to give films and, Young's modulus, flexural fatique resistance and the oxygen permeability of the films were measured.

Using a film-forming machine equipped with an extruder and a T-die, extrusion molding was carried out at 180° to 220° C. temperature of the extruder and 215° C. temperature of the T-die to give films each having a thickness of 15μ.

The Young's modulus was measured using as specimens films which had been moisture controlled for 7 days under conditions of 20° C. and 65% RH, by Autograph at a extension rate of 200%/mins., according to ASTM D-638.

The test of flexural fatique resistance was carried out using Gelbo Flex Tester (manufactured by Rigaku Kogyo Co., Ltd.), on a specimen of 12 in. by 8 in. made round into a cylinder having a diameter of 3½ in. in which both the ends were held of the stroke at an initial holding distance of 7 in. and a holding distance when flexed to the maximum of 1 in. To the specimen were applied repeated, reciprocating motions, one motion consisting of twisting at an angle of 440° in the first 3½ in. of the stroke and at subsequent 2½ in. linear horizontal motion at a rate of 40 times/min under conditions of 20° C. and 65% RH.

The measurement of the amount of gas permeation was performed after moisture control for 7 days under conditions of 20° C. and 65% RH as well as 20° C. and 85% RH, using OX-TRAN 100 manufactured by Modern Control Co., Ltd. The specimens provided for the measurement were those used for the test of flexural fatique resistance by changing the reciprocating motions to various times.

The results of these measurements are shown in Tables 1-1 and 1-2.

COMPARATIVE EXAMPLES 1-1 TO 1-2

Evaluation was also made using the aforesaid EVOH alone having and ethylene content of 32.1 mol%, a saponification degree of 99.5% in the vinyl acetate component and MI of 0.61 g/10 mins. (EVOH No. 1) (Comparative Example 1-1) and using the aforesaid EVOH alone having an ethylene content of 31.5 mol% and a saponification degree of 99.6% in the vinyl acetate component (EVOH No. 2) (Comparative Example 1-2) in a conventional manner, in place of the resin compositions of Examples 1-1 to 1-3. The results are shown in Tables 1-1 and 1-2.

TABLE 1-1

|  | Resin Composition Copolymer A/ EVOH No. 1 | MI (g/10 mins.) | Young's Modulus (kg/mm$^2$) |
|---|---|---|---|
| Example 1-1 | 10/90 | 1.0 | 187 |
| Example 1-2 | 20/80 | 1.7 | 163 |
| Example 1-3 | 30/70 | 2.9 | 139 |
| Comparative Example 1-1 | EVOH No. 1 alone | 0.61 | 215 |
| Comparative Example 1-2 | EVOH No. 2 alone | 2.5 | 220 |

TABLE 1-2

| | Number of Reciprocating Motion (time) | 0 | 50 | 100 | 200 |
|---|---|---|---|---|---|
| Example 1-1 | Number of Pinholes (/96 in$^2$) | 0 | 0 | 0 | 1 |
| | Amount of Oxygen Permeated (c.c.20 μ/m$^2$ · day · atm) | | | | |
| | 20° C., 65% RH | 0.6 | 0.6 | 0.7 | ∞ |
| | 20° C., 85% RH | 1.8 | 1.8 | 2.0 | ∞ |
| Example 1-2 | Number of Pinholes (/96 in$^2$) | 0 | 0 | 0 | 0 |
| | Amount of Oxygen Permeated (c.c.20 μ/m$^2$ · day · atm) | | | | |
| | 20° C., 65% RH | 0.7 | 0.7 | 0.7 | 0.8 |
| | 20° C., 85% RH | 2.2 | 2.2 | 2.3 | 2.3 |
| Example 1-3 | Number of Pinholes (/96 in$^2$) | 0 | 0 | 0 | 0 |
| | Amount of Oxygen Permeated (c.c.20 μ/m$^2$ · day · atm) | | | | |
| | 20° C., 65% RH | 0.8 | 0.8 | 0.8 | 0.9 |
| | 20° C., 85% RH | 2.7 | 2.7 | 2.7 | 2.9 |
| Comparative Example 1-1 | Number of Pinholes (/96 in$^2$) | 0 | 1 | 14 | 26 |
| | Amount of Oxygen Permeated (c.c.20 μ/m$^2$ · day · atm) | | | | |
| | 20° C., 65% RH | 0.5 | ∞ | ∞ | 28 |
| | 20° C., 85% RH | 1.5 | ∞ | ∞ | ∞ |
| Comparative Example 1-2 | Number of Pinholes (/96 in$^2$) | 0 | 1 | 16 | 31 |
| | Amount of Oxygen Permeated (c.c.20 μ/m$^2$ · day · atm) | | | | |
| | 20° C., 65% RH | 0.5 | ∞ | ∞ | 28 |
| | 20° C., 85% RH | 1.4 | ∞ | ∞ | ∞ |

Note:
∞ indicates that there is no oxygen barrier properties.

EXAMPLES 1-4 TO 1-6

In a polymerization tank as shown in Examples 1-1 to 1-3 were charged 25.0 kg of vinyl acetate and 3.9 g of thioacetic acid. After the air in the polymerization tank was replaced with nitrogen, the temperature was raised to 60° C. and ethylene was charged to render the pressure 60 kg/cm$^2$. Then, 100 g of polymerization initiator 2,2'-azobis-isobutyronitrile was dissolved in 1 liter of methanol and the solution was added to the reaction system. Subsequently, methanol solution of 11.7 g/l thioacetic acid was added to the system at a rate of 500 ml/hour for 8 hours for polymerization. The conversion of the vinyl acetate was 40%. Then, the copolymerization reaction solution was supplied to a stripping tower. After the unreacted vinyl acetate was removed from the top by feeding methanol from the bottom of the tower, saponification was performed using sodium hydroxide as a catalyst in a conventional manner. Then after thoroughly washing with water and then with acetone, the product was dried at 40° C. under reduced pressure.

Next, 6.0 kg of EVOH containing mercapto groups at the ends thereof obtained in the method described above, 2.5 kg of polyoxypropylene allyl ether (manufactured by Nippon Oils and Fats Co., Ltd., Unisafe PKA-5014) having a molecular weight of 1500 and containing a polymerizable double bond at one end thereof and 20 kg of dimethylsulfoxide were charged in the polymerization tank described above. After the air in the polymerization tank was replaced with nitrogen, the temperature was raised to 60° C. to obtain a homogeneous solution. Then 500 ml of a 100 g/l methanol solution of 2,2'-azobisisobutyronitrile was added to the system followed by reaction for 5 hours. Next, the reaction solution was added to 200 liters of acetone in small portions with stirring to precipitate the EVOH copolymer. After thoroughly washing with acetone, the product was immersed in a diluted aqueous acetic acid solution and the system was dried at 60° to 105° C. in a nitrogen flow. The thus obtained EVOH copolymer was a block copolymer wherein polyoxypropylene was added to one end of EVOH.

Employing NMR analysis, it was determined that the composition had an ethylene content of 44.2 mol% and a polyoxypropylene content of 24 wt%, and the saponification degree of the vinyl acetate component showed 99.4%. Further MI was 230 g/10 mins.

Next, the copolymer (copolymer B) and EVOH having the ethylene content of 45.1 mol%, a saponification degree in the vinyl acetate component of 99.5% and MI of 2.8 g/10 mins. (EVOH No. 2) were blended in various proportions. The blends were extrusion molded in a manner similar to Examples 1-1 to 1-3 to give films and, Young's modulus, flexural fatigue resistance and oxygen permeability of the films were measured. The results are shown in Tables 1-3 and 1-4.

COMPARATIVE EXAMPLES 1-3 TO 1-4

Evaluation was also made using the aforesaid EVOH alone having an ethylene content of 45.1 mol%, a saponification degree of 99.5% in the vinyl acetate component and MI of 2.8 g/10 mins. (EVOH No. 3) (Comparative Example 1-3) and using the aforesaid EVOH alone having an ethylene content of 44.3 mol%, a saponification degree of 99.3% in the vinyl acetate component and MI of 9.5 g/10 mins. (EVOH No. 4) (Comparative Example 1-4), in place of the resin compositions of Examples 1-4 to 1-6. The results are shown in Tables 1-3 and 1-4.

TABLE 1-3

| | Resin Composition Copolymer B/ EVOH No. 2 | MI (g/10 mins.) | Young's Modulus (kg/mm$^2$) |
|---|---|---|---|
| Example 1-4 | 10/90 | 4.4 | 130 |
| Example 1-5 | 20/80 | 6.8 | 101 |
| Example 1-6 | 30/70 | 10.5 | 72 |
| Comparative Example 1-3 | EVOH No. 3 alone | 2.8 | 151 |
| Comparative Example 1-4 | EVOH No. 4 alone | 9.5 | 148 |

TABLE 1-4

| | Number of Reciprocating Motion (time) | 0 | 70 | 150 | 250 |
|---|---|---|---|---|---|
| Example 1-4 | Number of Pinholes (/96 in$^2$) | 0 | 0 | 0 | 1 |
| | Amount of Oxygen Permeated (c.c.20 μ/m$^2$ · day · atm) | | | | |
| | 20° C., 65% RH | 1.5 | 1.5 | 1.8 | ∞ |
| | 20° C., 85% RH | 3.8 | 3.8 | 4.2 | ∞ |
| Example 1-5 | Number of Pinholes (/96 in$^2$) | 0 | 0 | 0 | 0 |
| | Amount of Oxygen Permeated (c.c.20 μ/m$^2$ · day · atm) | | | | |
| | 20° C., 65% RH | 1.8 | 1.8 | 2.1 | 2.5 |
| | 20° C., 85% RH | 4.5 | 4.6 | 4.9 | 5.5 |
| Example 1-6 | Number of Pinholes (/96 in$^2$) | 0 | 0 | 0 | 0 |
| | Amount of Oxygen Permeated (c.c.20 μ/m$^2$ · day · atm) | | | | |
| | 20° C., 65% RH | 2.2 | 2.3 | 2.5 | 2.8 |
| | 20° C., 85% RH | 5.5 | 5.7 | 5.9 | 6.2 |
| Comparative Example 1-3 | Number of Pinholes (/96 in$^2$) | 0 | 1 | 17 | 29 |
| | Amount of Oxygen Permeated (c.c.20 μ/m$^2$ · day · atm) | | | | |
| | 20° C., 65% RH | 1.3 | ∞ | ∞ | ∞ |
| | 20° C., 85% RH | 3.3 | ∞ | ∞ | ∞ |
| Comparative Example 1-4 | Number of Pinholes (/96 in$^2$) | 0 | 2 | 25 | 38 |
| | Amount of Oxygen Permeated (c.c. 20 μ/m$^2$ · day · atm) | | | | |
| | 20° C., 65% RH | 1.2 | ∞ | ∞ | ∞ |
| | 20° C., 85% RH | 3.1 | ∞ | ∞ | ∞ |

Note:
∞ indicates that there is no oxygen barrier properties.

EXAMPLES 1-7 TO 1-9

In a polymerization tank as in Examples 1-1 to 1-3 was charged a solution of 11.0 kg of vinyl acetate, 7.46 kg of polyoxypropylene allyl ether (manufactured by Nippon Oils and Fats Co., Ltd., Unisafe PKA-5018) having a molecular weight of 3000 and containing polymerizable double bonds at both ends thereof, 4.7 kg of methanol and 45 g of 2,2'-azobis-(2,4-dimethylvaleronitrile) dissolved in 500 ml of methanol and the ethylene pressure was rendered 37 kg/cm$^2$. Copolymerization was conducted at 60° C. for 6.8 hours. The conversion of the vinyl acetate was 40%. Then, the copolymerization reaction solution was supplied to a stripping tower. After the unreacted vinyl acetate was removed from the top by feeding methanol from the bottom of the tower, saponification was performed using sodium hydroxide as a catalyst in a conventional manner. Then after thoroughly washing with acetone and then with water, the product was immersed in a diluted aqueous acetic acid solution and the system was dried at 60° to 105° C. in a nitrogen flow. In the thus obtained EVOH copolymer, polyoxypropylene was added in a grafted form as a branch polymer of EVOH. Employing NMR analysis, it was determined that the composition had an ethylene content of 37.6 mol% and a polyoxypropylene content of 49 wt%, and the saponification degree of the vinyl acetate component showed 99.4%. Further MI was 0.51 g/10 mins.

Next, the copolymer (copolymer C) and EVOH having the ethylene content of 37.8 mol%, the saponification degree in the vinyl acetate component of 99.4% and MI of 1.3 g/10 mins. (EVOH No. 5) were blended in various proportions. The blends were formed into films in a manner similar to Examples 1-1 to 1-3 to give films having a thickness of 15μ. Young's modulus, flexural fatigue resistance and oxygen permeation of the films were measured. The results are shown in Tables 1-5 and 1-6.

COMPARATIVE EXAMPLE 1-5

Evaluation was also made using the aforesaid EVOH alone having the ethylene content of 37.8 mol%, the saponification degree of 99.4% in the vinyl acetate component and MI of 1.3 g/10 mins. (EVOH No. 5), in place of the resin compositions of Examples 1-7 to 1-9. The results are shown in Tables 1-5 and 1-6.

TABLE 1-5

|  | Resin Composition Copolymer C/ EVOH No. 5 | MI (g/10 mins.) | Young's Modulus (kg/mm$^2$) |
|---|---|---|---|
| Example 1-7 | 10/90 | 1.2 | 146 |
| Example 1-8 | 20/80 | 1.1 | 123 |
| Example 1-9 | 30/70 | 1.0 | 99 |
| Comparative Example 1-5 | EVOH No. 5 alone | 1.3 | 183 |

TABLE 1-6

|  | Number of Reciprocating Motion (time) | 0 | 60 | 100 | 200 |
|---|---|---|---|---|---|
| Example 1-7 | Number of Pinholes (/96 in$^2$) | 0 | 0 | 0 | 1 |
| | Amount of Oxygen Permeated (c.c.20 μ/m$^2$ · day · atm) | | | | |
| | 20° C., 65% RH | 1.0 | 1.0 | 1.3 | ∞ |
| | 20° C., 85% RH | 3.1 | 3.1 | 3.6 | ∞ |
| Example 1-8 | Number of Pinholes (/96 in$^2$) | 0 | 0 | 0 | 0 |
| | Amount of Oxygen Permeated (c.c.20 μ/m$^2$ · day · atm) | | | | |
| | 20° C., 65% RH | 1.2 | 1.2 | 1.3 | 1.5 |
| | 20° C., 85% RH | 3.8 | 3.8 | 4.0 | 4.6 |
| Example 1-9 | Number of Pinholes (/96 in$^2$) | 0 | 0 | 0 | 0 |
| | Amount of Oxygen Permeated (c.c.20 μ/m$^2$ · day · atm) | | | | |
| | 20° C., 65% RH | 1.5 | 1.5 | 1.7 | 2.0 |
| | 20° C., 85% RH | 4.8 | 4.8 | 5.0 | 5.5 |
| Comparative Example 1-5 | Number of Pinholes (/96 in$^2$) | 0 | 1 | 21 | 29 |
| | Amount of Oxygen Permeated (c.c.20 μ/m$^2$ · day · atm) | | | | |
| | 20° C., 65% RH | 0.8 | ∞ | ∞ | ∞ |
| | 20° C., 85% RH | 2.5 | ∞ | ∞ | ∞ |

Note:
∞ indicates that there is no oxygen barrier properties.

EXAMPLES 1-10 TO 1-12

In a reactor of a 10 liter volume equipped with a stirrer were charged 4.5 kg of thoroughly dehydrated poly(oxyethylene-oxypropylene) (manufactured by Nippon Oils and Fats Co., Ltd., Unirub DE-60) having a molecular weight of 3000, 480 g of methylenebis(4-phenylisocyanate), 64 g of thioglycerol and 36 g of acetic acid. Stirring was continued at 80° C. for 3 hours to synthesize polyether containing mercapto group at the side chain thereof.

Next, 14.5 kg of vinyl acetate and 55 g of the aforesaid polyether containing thiol group at the side chain thereof were charged in a polymerization tank as in Examples 1-1 to 1-3. After the air in the polymerization tank was replaced with nitrogen, the temperature was raised to 60° C. and ethylene was charged to render the pressure 43 kg/cm$^2$. Then, 14 g of polymerization initiator 2,2'-azobis-(2,4-dimethylvaleronitrile) was added to the system; thereafter, the polyether containing thiol groups at the side chain thereof was added at a rate of 404 g/hour for 5 hours to effect polymerization. The conversion of the vinyl acetate was 39%. Then, the copolymerization reaction solution was supplied to a stripping tower. After the unreacted vinyl acetate was removed from the top by feeding methanol from the bottom of the tower, saponification was performed using sodium hydroxide as a catalyst in a conventional manner. Then after thoroughly washing with acetone and then with water, the product was immersed in a diluted aqueous acetic acid solution and the system was dried at 60° to 105° C. in a nitrogen flow. In the thus obtained EVOH copolymer EVOH was added in a grafted form as a branch polymer of polyether. Employing NMR analysis it was determined that, the composition had an ethylene content of 31.8 mol% and a poly(oxyethylene-oxypropylene) content of 35 wt%, and the saponification degree of the vinyl acetate component showed 99.3%. Further MI was 170 g/10 mins.

Next, the copolymer (copolymer D) and EVOH having the ethylene content of 32.1 mol%, the saponification degree in the vinyl acetate component of 99.5% and MI of 0.61 g/10 mins. (EVOH No. 1) used in Examples 1-1 to 1-3 were blended in various proportions. The blends were extrusion molded in a manner similar to Examples 1-1 to 1-3 to give films having a thickness of 15μ. Young's modulus, flexural fatigue resistance and oxygen permeability of the films were measured. The results are shown in Tables 1-7 and 1-8.

COMPARATIVE EXAMPLES 1-6 TO 1-7

Evaluation was also made using the aforesaid EVOH alone having the ethylene content of 31.4 mol%, the saponification degree of 99.5% in the vinyl acetate component and MI of 1.2 g/10 mins. (EVOH No. 6) (Comparative Example 1-6) and using the aforesaid EVOH alone having the ethylene content of 32.3 mol%, the saponification degree of 99.6% in the vinyl acetate component and MI of 3.5 g/10 mins. (EVOH No. 7) (Comparative Example 1-7) in place of the resin compositions of Examples 1-10 to 1-12. The results are shown in Tables 1-7 and 1-8.

TABLE 1-7

|  | Resin Composition Copolymer D/ EVOH No. 1 | MI (g/10 mins.) | Young's Modulus (kg/mm$^2$) |
|---|---|---|---|
| Example 1-10 | 10/90 | 1.1 | 178 |
| Example 1-11 | 20/80 | 1.9 | 150 |
| Example 1-12 | 30/70 | 3.3 | 126 |
| Comparative Example 1-6 | EVOH No. 6 alone | 1.2 | 212 |
| Comparative Example 1-7 | EVOH No. 7 alone | 3.5 | 218 |

TABLE 1-8

|  | Number of Reciprocating Motion (time) | 0 | 50 | 100 | 200 |
|---|---|---|---|---|---|
| Example 1-10 | Number of Pinholes (/96 in$^2$) | 0 | 0 | 0 | 2 |
| | Amount of Oxygen Permeated (c.c.20 μ/m$^2$ · day · atm) | | | | |
| | 20° C., 65% RH | 0.6 | 0.7 | 0.9 | ∞ |
| | 20° C., 85% RH | 1.8 | 1.9 | 2.2 | ∞ |
| Example 1-11 | Number of Pinholes (/96 in$^2$) | 0 | 0 | 0 | 0 |
| | Amount of Oxygen Permeated (c.c.20 μ/m$^2$ · day · atm) | | | | |
| | 20° C., 65% RH | 0.7 | 0.7 | 0.8 | 1.1 |

TABLE 1-8-continued

|  |  | Number of Reciprocating Motion (time) | 0 | 50 | 100 | 200 |
|---|---|---|---|---|---|---|
| Example 1-12 |  | 20° C., 85% RH | 2.2 | 2.2 | 2.4 | 2.7 |
|  |  | Number of Pinholes (/96 in$^2$) | 0 | 0 | 0 | 0 |
|  |  | Amount of Oxygen Permeated (c.c. 20 $\mu$/m$^2$ · day · atm) |  |  |  |  |
| Comparative Example 1-6 |  | 20° C., 65% RH | 0.9 | 0.9 | 1.1 | 1.2 |
|  |  | 20° C., 85% RH | 2.9 | 2.9 | 3.2 | 3.5 |
|  |  | Number of Pinholes (/96 in$^2$) | 0 | 1 | 10 | 22 |
|  |  | Amount of Oxygen Permeated (c.c. 20 $\mu$/m$^2$ · day · atm) |  |  |  |  |
| Comparative Example 1-7 |  | 20° C., 65% RH | 0.5 | ∞ | ∞ | ∞ |
|  |  | 20° C., 85% RH | 1.5 | ∞ | ∞ | ∞ |
|  |  | Number of Pinholes (/96 in$^2$) | 0 | 2 | 17 | 29 |
|  |  | Amount of Oxygen Permeated (c.c. 20 $\mu$/m$^2$ · day · atm) |  |  |  |  |
|  |  | 20° C., 65% RH | 0.5 | ∞ | ∞ | ∞ |
|  |  | 20° C., 85% RH | 1.4 | ∞ | ∞ | ∞ |

Note:
∞ indicates that there is no oxygen barrier properties.

EXAMPLE 1-13

A laminate film composed of 3 kinds/5 layers (inner layer/adhesive layer/intermediate layer/outer layer) was obtained using Copolymer A shown in Examples 1-1 to 1-3 in a manner shown below. A film-forming machine comprising an extruder for the inner and outer layers, an extruder for the intermediate layer, an extruder for the adhesive layer and a T-die for 5 layers was employed. Molding temperatures for the extruder for the inner and outer layers, the extruder for the intermediate layer, the extruder for the adhesive layer and the T-die were at 160° to 220° C., 180° to 220° C., 120° to 220° C. and 225° C., respectively. The intermediate layer, the inner and outer layer and the adhesive layer were composed of a blend of 25 parts by weight of Copolymer A and 75 parts by weight of EVOH (EVOH No. 1), linear low density polyethylene containing 1-octene as a copolymerizable component and containing 3.3 mol% of the copolymerizable component and showing MI of 1.6 g/10 mins., and modified ethylene-vinyl acetate copolymer (MI of 2.0 g/10 mins.) having a vinyl acetate content of 33 wt% and 1.5 wt% of a maleic anhydride modification degree of 1.5 wt%, respectively. The thickness construction of the laminate film was that the intermediate layer, the inner and outer layer and the adhesive layer were 12$\mu$, 30$\mu$ each and 5$\mu$ each, respectively.

Next, the test of flexural fatigue resistance and oxygen permeability were carried out in a manner similar to Examples 1-1 to 1-3. The results are shown in Table 1-9.

COMPARATIVE EXAMPLE 1-8

A laminate film was obtained in a manner similar to Example 1-13 except that EVOH No. 1 alone was used as an intermediate layer in place of the blend of Copolymer A and EVOH No. 1. With respect to the laminate film, the flexural fatigue resistance was tested and the oxygen permeability was measured. The results are shown in Table 1-9.

TABLE 1-9

|  | Number of Reciprocating Motion (time) | 0 | 1500 | 3000 | 4500 |
|---|---|---|---|---|---|
| Example 1-13 | Number of Pinholes (/96 in$^2$) | 0 | 0 | 0 | 0 |
|  | Amount of Oxygen Permeated (c.c./m$^2$ · day · atm) |  |  |  |  |
|  | 20° C., 65% RH | 1.0 | 1.0 | 1.2 | 1.5 |

TABLE 1-9-continued

|  | Number of Reciprocating Motion (time) | 0 | 1500 | 3000 | 4500 |
|---|---|---|---|---|---|
|  | 20° C., 85% RH | 3.4 | 3.4 | 3.6 | 4.0 |
| Comparative Example 1-8 | Number of Pinholes (/96 in$^2$) | 0 | 0 | 3 | 7 |
|  | Amount of Oxygen Permeated (c.c./m$^2$ · day · atm) |  |  |  |  |
|  | 20° C., 65% RH | 0.6 | 0.8 | ∞ | ∞ |
|  | 20° C., 85% RH | 2.3 | 2.8 | ∞ | ∞ |

Note:
∞ indicates that there is no oxygen barrier properties.

EXAMPLE 1-14

A laminate film was obtained in a manner similar to Example 1-13 except that the blends of 25 parts by weight of Copolymer C shown in Examples 1-7 to 1-9 and 75 parts by weight of EVOH (EVOH No. 5) shown in Comparative Example 1-6 was used as an intermediate layer in place of the blend of Copolymer A and EVOH No. 1. With respect to the laminate film, the flexural fatigue resistance was tested and the oxygen permeability was measured. The results are shown in Table 1-10.

COMPARATIVE EXAMPLE 1-9

A laminate film was obtained in a manner similar to Example 1-14 except that EVOH No. 5 alone was used as an intermediate layer in place of the blend of Copolymer C and EVOH No. 5. With respect to the laminate film, the flexural fatigue resistance was tested and the oxygen permeability was measured. The results are shown in Table 1-10.

TABLE 1-10

|  | Number of Reciprocating Motion (time) | 0 | 1500 | 3000 | 4500 |
|---|---|---|---|---|---|
| Example 1-14 | Number of Pinholes (/96 in$^2$) | 0 | 0 | 0 | 0 |
|  | Amount of Oxygen Permeated (c.c./m$^2$ · day · atm) |  |  |  |  |
|  | 20° C., 65% RH | 1.5 | 1.5 | 1.8 | 2.3 |
|  | 20° C., 85% RH | 5.1 | 5.1 | 5.4 | 6.0 |
| Comparative Example 1-9 | Number of Pinholes (/96 in$^2$) | 0 | 0 | 3 | 7 |
|  | Amount of Oxygen Permeated (c.c./m$^2$ · day · atm) |  |  |  |  |
|  | 20° C., 65% RH | 0.9 | 1.2 | ∞ | ∞ |
|  | 20° C., 85% RH | 3.5 | 4.2 | ∞ | ∞ |

Note:
∞ indicates that there is no oxygen barrier properties.

EXAMPLE 1-15

A laminate film was obtained in a manner similar to Example 1-13 except that the blends of 25 parts by weight of Copolymer D shown in Examples 1-7 to 1-9 and 75 parts by weight of EVOH (EVOH No. 6) shown in Examples 1-10 to 1-12 was used as an intermediate layer in place of the blend of Copolymer A and EVOH No. 1. With respect to the laminate film, the flexural fatigue resistance was tested and the oxygen permeability was measured. The results are shown in Table 1-11.

COMPARATIVE EXAMPLE 1-10

A laminate film was obtained in a manner similar to Example 1-15 except that EVOH No. 6 alone was used as an intermediate layer in place of the blend of Copolymer D and EVOH No. 6. With respect to the laminate film, the flexural fatigue resistance was tested and the oxygen permeability was measured. The results are shown in Table 1-11.

TABLE 1-11

| Number of Reciprocating Motion (time) | 0 | 1500 | 3000 | 4500 |
|---|---|---|---|---|
| Example 1-15 | | | | |
| Number of Pinholes (/96 in$^2$) | 0 | 0 | 0 | 0 |
| Amount of Oxygen Permeated (c.c./m$^2$ · day · atm) | | | | |
| 20° C., 65% RH | 1.1 | 1.2 | 1.2 | 1.7 |
| 20° C., 85% RH | 3.5 | 3.6 | 3.7 | 4.2 |
| Comparative Example 1-10 | | | | |
| Number of Pinholes (/96 in$^2$) | 0 | 0 | 3 | 7 |
| Amount of Oxygen Permeated (c.c./m$^2$ · day · atm) | | | | |
| 20° C., 65% RH | 0.6 | 0.9 | ∞ | ∞ |
| 20° C., 85% RH | 2.2 | 2.8 | ∞ | ∞ |

Note: ∞ indicates that there is no oxygen barrier properties.

EXAMPLE 2-1

In a reactor of a 2 liter volume equipped with a stirrer were charged 1000 g of polyoxypropylene allyl ether (manufactured by Nippon Oils and Fats Co., Ltd., Unisafe PKA-5014) having a molecular weight of 1500 and containing polymerizable double bond at one end thereof and 0.065 g of benzoyl peroxide. While keeping the inner temperature at 40° C., thioacetic acid was continuously added to the mixture at a rate of 47 g/hour for 3 hours, with stirring. Then the unreacted thioacetic acid was removed out of the reaction system at 35° to 40° C. under reduced pressure. Next, 200 g of methanol and 0.55 g of sodium hydroxide were added to the system. After stirring at 60° C. for 2 hours in a nitrogen flow, acetic acid was added to the system to neutralize the excess sodium hydroxide. Titration of mercapto groups of the thus obtained mercapto-polyoxypropylene with $I_2$ showed $6.45 \times 10^{-4}$ eq/g, wherein the ends containing double bonds were almost quantitatively changed to mercapto groups.

Next, 27.6 kg of vinyl acetate and 11 g of mercapto-polyoxypropylene were charged in a polymerization tank as used in Examples 1-1 to 1-3. After the air in the polymerization tank was replaced with nitrogen, the temperature was raised to 60° C. and ethylene was charged to render the pressure 43 kg/cm$^2$. Then, 14 g of polymerization initiator 2,2'-azobisisobutyronitrile was dissolved in 400 ml of methanol and the solution was added to the reaction system. Subsequently, mercapto-polyoxypropylene was added to the system at a rate of 147 g/hour for 5 hours to effect polymerization. A conversion of the vinyl acetate was 39%. Then, the copolymerization reaction solution was supplied to a stripping tower. After the unreacted vinyl acetate was removed from the top by feeding methanol from the bottom of the tower, saponification was performed using sodium hydroxide as a catalyst in a conventional manner. After thoroughly washing with acetone and then with water, the product was immersed in a diluted aqueous acetic acid solution and the system was dried at 60° to 105° C. in a nitrogen flow. The thus obtained EVOH copolymer was a block copolymer wherein polyoxypropylene was added to one end of the EVOH. Employing NMR analysis, it was determined that the composition had an ethylene content of 31.0 mol% and a polyoxypropylene content of 9.4 wt%, and the saponification degree of the vinyl acetate component showed 99.4%. Further MI was 6.7 g/10 mins.

Next, Young's modulus was measured with respect to a film obtained using the copolymer (hereafter referred to as Copolymer E) alone and flexural fatigue resistance and oxygen permeability were measured with respect to a laminate film obtained by providing the copolymer as an intermediate layer, in a manner similar to Examples 1-1 to 1-3. The film provided for the measurement of Young's modulus obtained using the copolymer alone was produced by molding in a manner similar to Examples 1-1 to 1-3.

The laminate film of 3 kinds/5 layers (inner layer/adhesive layer/intermediate layer/outer layer) provided for the flexural resistance and the oxygen permeability was obtained in a manner similar to Example 1-13 under the same conditions as in Example 1-13. The intermediate layer, the inner and outer layer and the adhesive layer were composed of Copolymer E, linear low density polyethylene containing 4-methyl-1-pentene as a copolymerizable component and containing 2.6 mol% of the copolymerizable component and showing MI of 2.1 g/10 mins., and modified ethylene-vinyl acetate copolymer (MI of 2.0 g/10 mins.) having a vinyl acetate content of 33 wt% and 1.5 wt% of a maleic anhydride modification degree of 1.5 wt%, respectively. The thickness construction of the laminate film was that the intermediate layer, the inner and outer layer and the adhesive layer were 12μ, 30μ each and 5μ each, respectively.

The measurement results are shown in Tables 2-1 and 2-2.

COMPARATIVE EXAMPLE 2-1

Evaluation was also made using EVOH having an ethylene content of 32.0 mol%, a saponification degree of 99.4% in the vinyl acetate component and MI of 6.4 g/10 mins. in place of Copolymer E of Example 2-1. The results are shown in Tables 2-1 and 2-2.

TABLE 2-1

| | Young's Modulus (kg/mm$^2$) |
|---|---|
| Example 2-1 | 152 |
| Comparative Example 2-1 | 215 |

TABLE 2-2

| Number of Reciprocating Motion (time) | 0 | 1000 | 2000 | 3000 |
|---|---|---|---|---|
| Example 2-1 | | | | |
| Number of Pinholes (/96 in$^2$) | 0 | 0 | 0 | 2 |
| Amount of Oxygen Permeated (c.c./m$^2$ · day · atm) | | | | |
| 20° C., 65% RH | 0.9 | 0.9 | 1.2 | ∞ |
| 20° C., 85% RH | 2.8 | 2.9 | 3.1 | ∞ |
| Comparative Example 2-1 | | | | |
| Number of Pinholes (/96 in$^2$) | 0 | 3 | 15 | 35 |
| Amount of Oxygen Permeated (c.c./m$^2$ · day · atm) | | | | |
| 20° C., 65% RH | 0.6 | ∞ | ∞ | ∞ |
| 20° C., 85% RH | 2.3 | ∞ | ∞ | ∞ |

Note: ∞ indicates that there is no oxygen barrier properties.

EXAMPLE 2-2

A laminate film was obtained in a manner similar to Example 2-1 except that linear low density polyethylene containing 1-octene as a copolymerizable component, containing 3.3 mol% of the copolymerizable component and having MI of 1.6 g/10 mins. was used as inner and outer layers in place of 4-methyl-1-pentene-modified linear low density polyethylene. With the laminate film, flexural fatigue resistance and oxygen permeability were measured in a manner similar to Example 2-1. The results are shown in Table 2-3.

COMPARATIVE EXAMPLE 2-2

A laminate film was obtained in a manner similar to Example 2-2 except that EVOH having an ethylene content of 32.0 mol%, a saponification degree of 99.4% in the vinyl acetate component and MI of 6.4 g/10 mins. was used as an intermediate layer. With the laminate film, flexural fatigue resistance and oxygen permeability were measured. The results are shown in Table 2-3.

TABLE 2-3

| Number of Reciprocating Motion (time) | 0 | 1500 | 3000 | 4500 |
|---|---|---|---|---|
| Example 2-2 | | | | |
| Number of Pinholes (/96 in$^2$) | 0 | 0 | 0 | 0 |
| Amount of Oxygen Permeated (c.c./m$^2$ · day · atm) | | | | |
| 20° C., 65% RH | 0.9 | 0.9 | 1.3 | 1.7 |
| 20° C., 85% RH | 2.8 | 2.8 | 3.3 | 3.6 |
| Comparative Example 2-2 | | | | |
| Number of Pinholes (/96 in$^2$) | 0 | 0 | 3 | 7 |
| Amount of Oxygen Permeated (c.c./m$^2$ · day · atm) | | | | |
| 20° C., 65% RH | 0.6 | 0.9 | ∞ | ∞ |
| 20° C., 85% RH | 2.3 | 2.8 | ∞ | ∞ |

Note: ∞ indicates that there is no oxygen barrier properties.

EXAMPLE 2-3

While continuously adding the aforesaid mercapto-polyoxypropylene, vinyl acetate was copolymerized with ethylene in a manner similar to Example 2-1. Removal of the unreacted vinyl acetate, saponification, washing and drying were conducted to give a block copolymer, in which polyoxypropylene had been added to one end of the EVOH. Employing NMR analysis, it was determined that the composition had an ethylene content of 37.9 mol% and a polyoxypropylene content of 13.1 wt%, and the saponification degree of the vinyl acetate component showed 99.6%. Further MI of the copolymer was 10.1 g/10 mins.

Next, Young's modulus was measured in a manner similar to Examples 1-1 to 1-3 with respect to a film obtained using the copolymer (hereafter referred to as Copolymer F) alone. At the same time, a laminate film having the same structure as in Example 2-1 except for using Copolymer F as the intermediate layer was prepared and its flexural fatigue resistance and oxygen permeability were measured. The results are shown in Table 2-4 and 2-5.

COMPARATIVE EXAMPLE 2-3

Evaluation was made in a manner similar to Example 2-3 except that EVOH having an ethylene content of 38.2 mol%, a saponification degree of 99.5% in the vinyl acetate component and MI of 9.6 g/10 mins. was used in place of Copolymer F of Example 2-3. The results are shown in Tables 2-4 and 2-5.

TABLE 2-4

| | Young's Modulus (kg/mm$^2$) |
|---|---|
| Example 2-3 | 121 |
| Comparative Example 2-3 | 190 |

TABLE 2-5

| Number of Reciprocating Motion (time) | 0 | 1500 | 3000 | 4500 |
|---|---|---|---|---|
| Example 2-3 | | | | |
| Number of Pinholes (/96 in$^2$) | 0 | 0 | 0 | 1 |
| Amount of Oxygen Permeated (c.c./m$^2$ · day · atm) | | | | |
| 20° C., 65% RH | 1.8 | 1.9 | 2.0 | ∞ |
| 20° C., 85% RH | 5.8 | 5.8 | 6.2 | ∞ |
| Comparative Example 2-3 | | | | |
| Number of Pinholes (/96 in$^2$) | 0 | 2 | 15 | 32 |
| Amount of Oxygen Permeated (c.c./m$^2$ · day · atm) | | | | |
| 20° C., 65% RH | 1.2 | ∞ | ∞ | ∞ |
| 20° C., 85% RH | 4.0 | ∞ | ∞ | ∞ |

Note: ∞ indicates that there is no oxygen barrier properties.

EXAMPLE 2-4

In a reactor of a 2 liter volume equipped with a stirrer were charged 1000 g of polyoxypropylene allyl ether (manufactured by Nippon Oils and Fats Co., Ltd., Unisafe PKA-5018) having a molecular weight of 3000 and containing polymerizable double bonds at both ends thereof and 7 mg of benzoyl peroxide. While keeping the inner temperature at 30° C., thioacetic acid was continuously added to the mixture at a rate of 27 g/hour for 3 hours, with stirring. Then the unreacted thioacetic acid was removed out of the reaction system at 35° to 40° C. under reduced pressure. Next, 200 g of methanol and 0.55 g of sodium hydroxide were added to the system. After stirring at 60° C. for 2 hours in a nitrogen flow, acetic acid was added to the system to neutralize the excess sodium hydroxide. Titration of mercapto groups of the thus obtained mercapto-polyoxypropylene with I$_2$ showed 6.56×10$^{-4}$ eq/g, wherein both ends containing double bonds were almost quantitatively changed to mercapto groups.

Next, 26.1 kg of vinyl acetate and 11 g of mercapto-polyoxypropylene were charged in a polymerization tank as used in Examples 1-1 to 1-3. After the air in the polymerization tank was replaced with nitrogen, the temperature was raised to 60° C. and ethylene was charged to render the pressure 44 kg/cm$^2$. Then, 50 g of polymerization initiator 2,2'-azobisisobutyronitrile was dissolved in 500 ml of methanol and the solution was added to the reaction system. Subsequently, mercapto-polyoxypropylene was added to the system at a rate of 230 g/hour for 3.3 hours to effect polymerization. The conversion of the vinyl acetate was 42%. Then, the copolymerization reaction solution was supplied to a stripping tower. After the unreacted vinyl acetate was removed from the top by feeding methanol from the bottom of the tower, saponification was performed using sodium hydroxide as a catalyst in a conventional manner. After thoroughly washing with acetone and then with water, the product was immersed in a diluted aqueous acetic acid solution and the system was dried at 60° to 105° C. in nitrogen flow. The thus obtained EVOH copolymer was a block copolymer wherein EVOH had been added to the both ends of polyoxypropylene. Employing NMR analysis, it was determined that the composition had an ethylene content of 31.0 mol% and a polyoxypropylene content of 9.7 wt%, and the saponification degree of the vinyl acetate component showed 99.3%. Further MI was 1.4 g/10 mins.

Next, Young's modulus was measured with respect to a film obtained using the copolymer (hereafter referred to as Copolymer G) alone in a manner similar to Examples 1-1 to 1-3. At the same time, a laminate film having the same structure as in Example 2-2 except for using Copolymer G as the intermediate layer was prepared and, its flexural fatigue resistance and oxygen permeability were measured. The results are shown in Tables 2-b 6 to 2-7.

COMPARATIVE EXAMPLE 2-4

Evaluation was made in a manner similar to Example 2-4 except that EVOH having an ethylene content of 31.3 mol%, a saponification degree of 99.5% in the vinyl acetate component and MI of 1.6 g/10 mins. was used in place of Copolymer G of Example 2-4. The results are shown in Tables 2-6 and 2-6.

TABLE 2-6

|  | Young's Modulus (kg/mm$^2$) |
|---|---|
| Example 2-4 | 140 |
| Comparative Example 2-4 | 218 |

TABLE 2-7

| Number of Reciprocating Motion (time) | 0 | 1500 | 3000 | 4500 |
|---|---|---|---|---|
| Example 2-4 | | | | |
| Number of Pinholes (/96 in$^2$) | 0 | 0 | 0 | 0 |
| Amount of Oxygen Permeated (c.c./m$^2$ · day · atm) | | | | |
| 20° C., 65% RH | 0.9 | 1.0 | 1.4 | 1.8 |
| 20° C., 85% RH | 2.9 | 2.9 | 3.2 | 3.8 |
| Comparative Example 2-4 | | | | |
| Number of Pinholes (/96 in$^2$) | 0 | 0 | 4 | 8 |
| Amount of Oxygen Permeated (c.c./m$^2$ · day · atm) | | | | |
| 20° C., 65% RH | 0.6 | 0.8 | ∞ | ∞ |
| 20° C., 85% RH | 2.2 | 2.7 | ∞ | ∞ |

Note: ∞ indicates that there is no oxygen barrier properties.

EXAMPLE 2-5

While continuously adding the aforesaid mercapto-polyoxypropylene, vinyl acetate was copolymerized with ethylene in a manner similar to Example 2-4. Removal of the unreacted vinyl acetate, saponification, washing and drying were conducted to give a block copolymer, in which EVOH had been added to both ends of polyoxypropylene. Employing NMR analysis, it was determined that the composition had an ethylene content of 43.8 mol% and a polyoxypropylene content of 15.2 wt%, and the saponification degree of the vinyl acetate component showed 99.6%. Further MI of the copolymer was 6.1 g/10 mins.

Next, Young's modulus was measured with respect to a film obtained using the copolymer (hereafter referred to as Copolymer H) alone in a manner similar to Examples 1-1 to 1-3. At the same time, a laminate film having the same structure as in Example 2-1 except for using Copolymer H as the intermediate layer was prepared and its flexural fatigue resistance and an oxygen permeability were measured. The results are shown in Tables 2-8 and 2-9.

COMPARATIVE EXAMPLE 2-5

Evaluation was made in a manner similar to Example 2-5 except that EVOH having an ethylene content of 44.1 mol%, a saponification degree of 99.5% in the vinyl acetate component and MI of 5.8 g/10 mins. was used in place of Copolymer H of Example 2-5. The results are shown in Tables 2-8 and 2-9.

TABLE 2-8

|  | Young's Modulus (kg/mm$^2$) |
|---|---|
| Example 2-5 | 102 |
| Comparative Example 2-5 | 157 |

TABLE 2-9

| Number of Reciprocating Motion (time) | 0 | 2000 | 3500 | 5000 |
|---|---|---|---|---|
| Example 2-5 | | | | |
| Number of Pinholes (/96 in$^2$) | 0 | 0 | 0 | 0 |
| Amount of Oxygen Permeated (c.c./m$^2$ · day · atm) | | | | |
| 20° C., 65% RH | 2.3 | 2.4 | 2.6 | 3.1 |
| 20° C., 85% RH | 6.8 | 6.8 | 7.2 | 7.9 |
| Comparative Example 2-5 | | | | |
| Number of Pinholes (/96 in$^2$) | 0 | 1 | 15 | 33 |
| Amount of Oxygen Permeated (c.c./m$^2$ · day · atm) | | | | |
| 20° C., 65% RH | 1.8 | ∞ | ∞ | ∞ |
| 20° C., 85% RH | 5.3 | ∞ | ∞ | ∞ |

Note: ∞ indicates that there is no oxygen barrier properties.

EXAMPLE 2-6

A laminate sheet using the block copolymer (Copolymer E) having added the polyoxypropylene to one end of the EVOH shown in Example 2-1 as an intermediate layer formed in a manner similar to Example 2-1. In this case, the inner and outer layers were polypropylene (manufactured by Mitsubishi Oils and Fats Co., Ltd., Nobren MA-6) and the adhesive layer was maleic anhydride-modified polypropylene (manufactured by Mitsui Petrochemical Co., Ltd., Adomer QF-500). Then, the laminate sheet was subjected to solid phase air-pressure forming under such conditions that the surface temperature of the sheet became 145° C., to give a cylindrical cup having an inner volume of 1.6 liters, which had an inner diameter (D) of 100 mm, depth (L) of 200 mm (draw ratio L/D=2) and a thickness of 0.5 mm. A ratio in thickness of the outer layer:adhesive layer:intermediate layer:adhesive layer:inner layer was 45:2.5:5:2.5:45. Properties of the cup are shown in Table 2-8.

COMPARATIVE EXAMPLE 2-6

A cylindrical cup was formed in a manner similar to Example 2-6 except that the EVOH shown in Comparative Example 2-1 was used as an intermediate layer in place of Copolymer E of Example 2-5. Properties of the cup are shown in Table 2-10.

TABLE 2-10

|  | Appearance of Intermediate Layer | | Amount of Oxygen Permeated (cc/m$^2$ · 24 hr · atm) | |
|---|---|---|---|---|
|  | Crack | Unevenness in Drawing | 20° C., 65% RH | 20° C., 85% RH |
| Example 2-6 | o | o | 0.6 | 2.0 |
| Comparative Example 2-6 | x | x | 0.7 | 2.2 |

Note 1: Crack
o No crack was noted.
x Many cracks were observed.
Note 2: Unevenness in Drawing
o No uneven drawing was noted.
x Unevenness drawing was noted frequently.

EXAMPLE 3-1

In a polymerization tank in Examples 1-1 to 1-3 were charged 13.7 kg of vinyl acetate and 0.70 kg of polyoxypropylene allyl ether (manufactured by Nippon Oils and Fats Co., Ltd., Unisafe PKA-5014) having a molecular weight of 1500 and containing a polymerizable double bond at one end thereof, 1.0 kg of methanol and 11 g of polymerization initiator of 2,2'-azobisisobutyronitrile. The ethylene pressure was rendered 60 kg/cm$^2$ followed by copolymerization at 60° C. for 6 hours. The conversion of the vinyl acetate was 40%. Then, the copolymerization reaction solution was treated in a manner similar to Examples 1-7 to 1-9 to give EVOH copolymer.

In the thus obtained EVOH copolymer, polyoxypropylene had been added in a grafted form as a branch polymer of the EVOH. Employing NMR analysis, it was determined that the composition had an ethylene content of 31.9 mol% and a polyoxypropylene content of 7.2 wt%, and the saponification degree of the vinyl acetate component was 99.4%. Further MI was 1.3 g/10 mins.

Next, Young's modulus of the copolymer (hereafter referred to as Copolymer I) alone and flexural fatigue resistance and oxygen permeability of a laminate film obtained by providing the copolymer as an intermediate layer were measured in a manner similar to Examples 1-1 to 1-3.

In addition, impact strength [Izod impact strength (notched)] of Copolymer I alone was also measured; this test was performed in accordance with ASTM D-256 under conditions of 65% RH by varying temperatures, using as a specimen a molded product (2.5 in×½ in×⅛ in) obtained by press-forming the copolymer at 220° C. in a standard mold. The film of the copolymer alone provided for the measurement of Young's modulus was obtained by extrusion film-forming in a manner similar to Examples 1-1 to 1-3.

The laminate film of 3 kinds/5 layers (inner layer/adhesive layer/intermediate layer/outer layer) provided for the flexural resistance and oxygen permeability was obtained in a manner similar to Example 1-13 under the same conditions as in Example 1-13. The intermediate layer, the inner and outer layer and the adhesive layer were composed of Copolymer I, linear low density polyethylene containing 4-methyl-1-pentene as a copolymerizable component and containing 2.6 mol% of the copolymerizable component and showing MI of 2.1 g/10 mins., and modified ethylene-vinyl acetate copolymer (MI of 2.0 g/10 mins.) having a vinyl acetate content of 33 wt% and a maleic anhydride modification degree of 1.5 wt%, respectively. The thickness construction of the laminate film was that the intermediate layer, the inner and outer layer and the adhesive layer were 12μ, 30μ each and 5μ each, respectively.

These measurement results are shown in Tables 3-1 and 3-2.

COMPARATIVE EXAMPLE 3-1

Evaluation was made in a manner similar to Example 3-1 except that the EVOH having an ethylene content of 32.0 mol%, a saponification degree of 99.4% in the vinyl acetate component and MI of 1.3 g/10 mins. was used in place of Copolymer I of Example 3-1. The evaluated results are shown in Tables 3-1 and 3-2.

TABLE 3-1

| | Young's Modulus (kg/mm$^2$) | Izod Impact Strength (kg-cm/cm) | | |
|---|---|---|---|---|
| | | 20° C. | 0° C. | −20° C. |
| Example 3-1 | 154 | 7.1 | 5.2 | 3.8 |
| Comparative Example 3-1 | 220 | 1.0 | 0.7 | 0.5 |

TABLE 3-2

| Number of Reciprocating Motion (time) | 0 | 1000 | 2000 | 3000 |
|---|---|---|---|---|
| Example 3-1 | | | | |
| Number of Pinholes (/96 in$^2$) | 0 | 0 | 0 | 2 |
| Amount of Oxygen Permeated (c.c./m$^2$ · day · atm) | | | | |
| 20° C., 65% RH | 0.8 | 0.8 | 0.9 | ∞ |
| 20° C., 85% RH | 2.7 | 2.8 | 2.8 | ∞ |
| Comparative Example 3-1 | | | | |
| Number of Pinholes (/96 in$^2$) | 0 | 3 | 16 | 30 |
| Amount of Oxygen Permeated (c.c./m$^2$ · day · atm) | | | | |
| 20° C., 65% RH | 0.6 | ∞ | ∞ | ∞ |
| 20° C., 85% RH | 2.3 | ∞ | ∞ | ∞ |

Note: ∞ indicates that there is no oxygen barrier properties.

EXAMPLE 3-2

A laminate film was obtained in a manner similar to Example 3-1 except that linear low density polyethylene containing 1-octene as a copolymerizable component, containing 3.3 mol% of the copolymerizable component and having MI of 1.6 g/10 mins. was used as inner and outer layers in place of 4-methyl-1-pentene-modified linear low density polyethylene. With the laminate film, flexural fatigue resistance and oxygen permeability were measured in a manner similar to Example 3-1. The results are shown in Table 3-3.

COMPARATIVE EXAMPLE 3-2

A laminate film was obtained in a manner similar to Example 3-2 except that the EVOH having an ethylene content of 32.0 mol%, a saponification degree of 99.4% in the vinyl acetate component and MI of 1.3 g/10 mins. was used as an intermediate layer. With the laminate film, flexural fatigue resistance and oxygen permeability were measured. The results are shown in Table 3-3.

TABLE 3-3

| Number of Reciprocating Motion (time) | 0 | 1500 | 3000 | 4500 |
|---|---|---|---|---|
| Example 3-2 | | | | |
| Number of Pinholes (/96 in$^2$) | 0 | 0 | 0 | 0 |
| Amount of Oxygen Permeated (c.c./m$^2$ · day · atm) | | | | |
| 20° C., 65% RH | 0.8 | 0.8 | 0.9 | 1.0 |
| 20° C., 85% RH | 2.7 | 2.7 | 2.8 | 3.0 |
| Comparative Example 3-2 | | | | |
| Number of Pinholes (/96 in$^2$) | 0 | 0 | 3 | 6 |
| Amount of Oxygen Permeated (c.c./m$^2$ · day · atm) | | | | |
| 20° C., 65% RH | 0.6 | 0.7 | ∞ | ∞ |
| 20° C., 85% RH | 2.3 | 2.5 | ∞ | ∞ |

Note: ∞ indicates that there is no oxygen barrier properties.

EXAMPLE 3-3

Vinyl acetate, polyoxypropylene allyl ether (manufactured by Nippon Oils and Fats Co., Ltd., Unisafe PKA-5018) having a molecular weight of 3000 and containing polymerizable double bonds at both ends thereof and ethylene were copolymerized in a manner similar to Example 3-1. Then, removal of the unreacted vinyl acetate, saponification, washing and drying were conducted to give a graft copolymer, in which polyoxypropylene had been added as a branch copolymer of EVOH in a grafted form. Employing NMR analysis, it was determined that the composition had an ethylene content of 38.0 mol% and a polyoxypropylene content of 12.2 wt%, and the saponification degree of the vinyl acetate component was 99.6%. Further, MI of the copolymer was 2.1 g/10 mins.

Next, Young's modulus and Izod impact strength (notched) of the copolymer (Copolymer J) alone were measured in a manner similar to Example 3-1. At the same time, a laminate film having the same structure as in Example 3-1 except for using Copolymer J as the intermediate layer was prepared and its flexural fatigue resistance and oxygen permeability were measured. The results are shown in Tables 3-4 and 3-5.

COMPARATIVE EXAMPLE 3-3

Evaluation was made in a manner similar to Example 3-3 except that EVOH having an ethylene content of 38.2 mol%, a saponification degree of 99.5% in the vinyl acetate component and MI of 1.7 g/10 mins. was used in place of Copolymer J of Example 3-3. The results are shown in Tables 3-4 and 3-5.

TABLE 3-4

| | Young's Modulus (kg/mm$^2$) | Izod Impact Strength (kg-cm/cm) | | |
|---|---|---|---|---|
| | | 20° C. | 0° C. | −20° C. |
| Example 3-3 | 124 | 9.5 | 7.2 | 5.1 |
| Comparative Example 3-3 | 190 | 1.4 | 0.8 | 0.5 |

TABLE 3-5

| Number of Reciprocating Motion (time) | 0 | 1500 | 3000 | 4500 |
|---|---|---|---|---|
| Example 3-3 | | | | |
| Number of Pinholes (/96 in$^2$) | 0 | 0 | 0 | 1 |
| Amount of Oxygen Permeated (c.c./m$^2$ · day · atm) | | | | |
| 20° C., 65% RH | 1.8 | 1.8 | 1.9 | ∞ |
| 20° C., 85% RH | 5.8 | 5.8 | 6.0 | ∞ |
| Comparative Example 3-3 | | | | |
| Number of Pinholes (/96 in$^2$) | 0 | 2 | 20 | 34 |
| Amount of Oxygen Permeated (c.c./m$^2$ · day · atm) | | | | |
| 20° C., 65% RH | 1.2 | ∞ | ∞ | ∞ |
| 20° C., 85% RH | 4.0 | ∞ | ∞ | ∞ |

Note:
∞ indicates that there is no oxygen barrier properties.

EXAMPLE 3-4

Vinyl acetate, polyoxytetramethylene having a molecular weight of 2300 and containing a polymerizable double bond at one end thereof and ethylene were copolymerized in a manner similar to Example 3-1. Then, removal of the unreacted vinyl acetate, saponification, washing and drying were conducted to give a graft copolymer, in which polyoxytetramethylene had been added as a branch polymer of EVOH in a grafted form. Employing NMR analysis, the composition had an ethylene content of 44.5 mol% and a polyoxytetramethylene content of 9.8 wt%, and the saponification degree of the vinyl acetate component was 99.3%. Further, MI of the copolymer was 5.1 g/10 mins.

Next, Young's modulus and Izod impact strength (notched) of the copolymer (Copolymer K) alone were measured in a manner similar to Example 3-1. At the same time, a laminate film having the same structure as in Example 3-1 except for using Copolymer K as the intermediate layer was prepared and its flexural fatigue resistance and oxygen permeability were measured. The results are shown in Tables 3-6 and 3-7.

COMPARATIVE EXAMPLE 3-4

Evaluation was made in a manner similar to Example 3-4 except that the EVOH having an ethylene content of 44.2 mol%, a saponification degree of 99.5% in the vinyl acetate component and MI of 1.54 g/10 mins. were used in place of Copolymer K of Example 3-4. The results are shown in Tables 3-6 and 3-7.

TABLE 3-6

| | Young's Modulus (kg/mm$^2$) | Izod Impact Strength (kg-cm/cm) | | |
|---|---|---|---|---|
| | | 20° C. | 0° C. | −20° C. |
| Example 3-4 | 104 | 8.8 | 6.9 | 4.2 |
| Comparative Example 3-4 | 160 | 1.1 | 0.7 | 0.5 |

TABLE 3-7

| Number of Reciprocating Motion (time) | 0 | 2000 | 3500 | 5000 |
|---|---|---|---|---|
| Example 3-4 | | | | |
| Number of Pinholes (/96 in$^2$) | 0 | 0 | 0 | 1 |
| Amount of Oxygen Permeated (c.c./m$^2$ · day · atm) | | | | |
| 20° C., 65% RH | 2.3 | 2.3 | 2.5 | ∞ |
| 20° C., 85% RH | 6.4 | 6.5 | 7.0 | ∞ |
| Comparative Example 3-4 | | | | |
| Number of Pinholes (/96 in$^2$) | 0 | 1 | 15 | 32 |
| Amount of Oxygen Permeated (c.c./m$^2$ · day · atm) | | | | |
| 20° C., 65% RH | 1.8 | ∞ | ∞ | ∞ |
| 20° C., 85% RH | 5.3 | ∞ | ∞ | ∞ |

Note:
∞ indicates that there is no oxygen barrier properties.

EXAMPLE 3-5

Poly(oxyethylene-oxypropylene) having a molecular weight of 3000 and containing mercapto groups at the side chain was charged and copolymerized with ethylene and vinyl acetate in a manner similar to Examples 1-10 to 1-12. Then, removal of the unreacted vinyl acetate, saponification, washing and drying were conducted to give a graft copolymer, in which EVOH had been added as a branch polymer of the polyether in a grafted form. Employing NMR analysis, it was determined that the composition had an ethylene content of 34.2 mol% and a poly(oxyethylene-oxypropylene) content of 8.5 wt%, and the saponification degree of the vinyl acetate component was 99.4%. Further, MI was 9.2 g/10 mins.

Next, a laminate film having the same structure as in Example 3-1 except for using the copolymer (Copolymer L) as the intermediate layer was prepared and its flexural fatigue resistance and oxygen permeability were measured. The results are shown in Table 3-8.

COMPARATIVE EXAMPLE 3-5

Evaluation was made in a manner similar to Example 3-5 except that the EVOH having an ethylene content of 34.1 mol%, a saponification degree of 99.5% in the vinyl acetate component and MI of 10.1 g/10 mins. was used in place of Copolymer L of Example 3-5. The results are shown in Table 3-8.

TABLE 3-8

| Number of Reciprocating Motion (time) | 0 | 1000 | 2000 | 3000 |
| --- | --- | --- | --- | --- |
| Example 3-5 | | | | |
| Number of Pinholes (/96 in$^2$) | 0 | 0 | 0 | 2 |
| Amount of Oxygen Permeated (c.c./m$^2$ · day · atm) | | | | |
| 20° C., 65% RH | 0.9 | 0.9 | 1.0 | ∞ |
| 20° C., 85% RH | 2.8 | 2.9 | 2.9 | ∞ |
| Comparative Example 3-5 | | | | |
| Number of Pinholes (/96 in$^2$) | 0 | 3 | 16 | 30 |
| Amount of Oxygen Permeated (c.c./m$^2$ · day · atm) | o | | | |
| 20° C., 65% RH | 0.7 | ∞ | ∞ | ∞ |
| 20° C., 85% RH | 2.3 | ∞ | ∞ | ∞ |

Note:
∞ indicates that there is no oxygen barrier pooperties.

EXAMPLE 3-6

A laminate sheet, having the EVOH copolymer (Copolymer I) having added the polyoxypropylene as a branch polymer of EVOH in a grafted form shown in Example 2-1 as an intermediate layer, was formed in a manner similar to Example 3-1. In this case, the inner and outer layers were polypropylene (manufactured by Mitsubishi Oils and Fats Co., Ltd., Nobren MA-6) and the adhesive layer was maleic anhydride-modified polypropylene (manufactured by Mitsui Petrochemical Co., Ltd., Adomer QF-500). Then, the laminate sheet was subjected to solid phase air-pressure forming under such conditions that the surface temperature of the sheet became 145° C., to give a cylindrical cup having an inner volume of 1.6 liters, which had an inner diameter (D) of 100 mm, depth (L) of 200 mm (draw ratio L/D=2) and a thickness of 0.5 mm. A ratio in thickness of the outer layer:adhesive layer:intermediate layer:adhesive layer:inner layer was 45:2.5:5:2.5:45. Properties of the cup are shown in Table 2-8.

COMPARATIVE EXAMPLE 3-6

A cylindrical cup was formed in a manner similar to Example 3-6 except that EVOH shown in Comparative Example 3-1 was used as an intermediate layer in place of Copolymer I of Example 3-1. Properties of the cup are shown in Table 3-9.

TABLE 3-9

| | Appearance of Intermediate Layer | | Amount of Oxygen Permeated (cc/m$^2$ · 24 hr · atm) | |
| --- | --- | --- | --- | --- |
| | Crack | Unevenness in Drawing | 20° C., 65% RH | 20° C., 85% RH |
| Example 3-6 | o | o | 0.6 | 2.0 |
| Comparative Example 3-6 | x | x | 0.7 | 2.3 |

Note 1: Crack
o No crack was noted.
x Many cracks were observed.
Note 2: Unevenness in Drawing
o No uneven drawing was noted.
x Unevenness drawing was noted frequently.

While the invention has been described in detail and with reference to specific embodiments thereof, it will be apparent to one skilled in the art that various changes and modifications can be made therein without departing from the spirit and scope thereof.

What is claimed is:

1. A resin composition comprising 95 to 50 parts by weight of a saponified ethylene-vinyl acetate copolymer and 5 to 50 parts by weight of a saponified ethylene-vinyl acetate copolymer containing a polyether component.

2. A resin composition as claimed in claim 1 wherein said saponified ethylene-vinyl acetate copolymer containing a polyether component is a block copolymer of the polyether component and the saponified ethylene-vinyl acetate copolymer component.

3. A resin composition as claimed in claim 1 wherein said saponified ethylene-vinyl acetate copolymer containing a polyether component is one that the polyether component is added as a branch polymer of the saponified ethylene-vinyl acetate copolymer in a grafted form.

4. A resin composition as claimed in claim 1 wherein said saponified ethylene-vinyl acetate copolymer containing a polyether component is one that the saponified ethylene-vinyl acetate copolymer component is added as a branch polymer of the polyether component in a grafted form.

5. A resin composition as claimed in claim 1 wherein said polyether component comprises an oxypropylene unit.

* * * * *